Dec. 6, 1955      W. S. DORSEY      2,726,276

ACETYLENE-MAKING PROCESS

Filed March 26, 1951

INVENTOR.
WILLIAM SMITH DORSEY,
BY Richard C. Hoffman
ATTORNEY.

United States Patent Office

2,726,276
Patented Dec. 6, 1955

2,726,276

ACETYLENE-MAKING PROCESS

William Smith Dorsey, Fullerton, Calif., assignor to Union Oil Company of California, Los Angeles, Calif., a corporation of California Application March 26, 1951, Serial No. 217,633

8 Claims. (Cl. 260—679)

This invention relates to the production of acetylene by the partial oxidation of hydrocarbon vapors, and in particular concerns a process for effecting the production of acetylene in a highly efficient and economic manner.

In the co-pending application of John L. Bills, Serial No. 240,728, filed August 7, 1951, now U. S. Patent No. 2,679,544, there is described a process whereby acetylene is produced by preheating a gas mixture comprising a hydrocarbon and oxygen, admixing hydrogen with the preheated gas mixture whereby an exothermic reaction occurs with a consequent increase in temperature to about 1100°–1500° C., and thereafter quench cooling the resulting product gas to a relatively low temperature within a very short period of time. The preheat temperature is so controlled that the requisite high reaction temperature derives from the exothermic heat of the reaction itself and without the addition of any further substantial quantity of heat. This process is highly effective in securing relatively high yields of acetylene based on the quantity of hydrocarbon consumed, and is particularly attractive from the standpoint of chemical cost since air may be employed as the source of oxygen and the hydrocarbon may be low-cost natural gas. Heating costs, however, are considerable, particularly when air is employed as a source of oxygen, since a large volume of gas must be preheated to moderately high temperatures, e. g. about 600° C. or higher, and despite the fact that the reaction itself is highly exothermic and evolves large quantities of heat, substantially all of such heat is lost in the cooling step to the quenching medium. Previous attempts to combine the preheating step with the quenching step so that the hot product gas is used to preheat the feed gas and is itself thereby quenched have not proved successful, primarily by reason of the limitations of conventional heat transfer equipment, and also by reason of the fact that the hot product gas must be quenched within a very short period of time after its formation. Potentially, however, the process is capable of being operated autothermically since the exothermic heat of reaction is sufficient to heat the reactant gas to the requisite preheat temperature.

It is accordingly an object of the present invention to provide a method for improving the thermal efficiency of the aforesaid process for the production of acetylene.

Another object is to provide a method for operating the aforesaid acetylene process in an autothermic manner, i. e., without the substantial consumption of heat supplied from external sources.

A further object is to provide an autothermic process for the production of acetylene whereby the reactants are preheated indirectly by the cooling of hot product gases.

Other objects will be apparent from the following detailed description of the invention, and various advantages not specifically referred to herein will occur to those skilled in the art upon employment of the invention in practice.

I have now found that the above and related objects may be realized in a process wherein a reactant gas mixture comprising a hydrocarbon and oxygen is divided into two streams of substantially equal volume, each of which streams is introduced into opposite ends of a reactor and is passed successively through a preheating zone, a reaction zone and a quenching zone. The reactor is so constructed that the preheating zone for one stream of gas lies immediately adjacent the quenching zone for the other stream, and the two reaction zones lie substantially side-by-side, each set of preheating, reaction and quenching zones being separated from the other by heat-conducting walls. Hydrogen, or a hydrogen-containing gas, is admixed with each stream of preheated reactant gas as it enters its respective reaction zone, whereby the exothermic acetylene-producing reaction is initiated and the high reaction temperature thereby attained.

According to the process of the invention, two streams of reactant gas are introduced into the reactor and two corresponding streams of cooled product gas are removed. Within the reactor the separate streams move countercurrent and in indirect heat exchange relationship with one another so that one stream of hot product gas is quenched by giving up its sensible heat to the other stream of reactant gas, thereby heating the latter to the required preheat temperature. Thermal energy is thus recirculated within the reactor itself and results in such a high degree of heat efficiency that the process may be carried out substantially autothermically, i. e., without the substantial addition of heat, once steady-state condition has been established. By suitably controlling the gas velocity with respect to the volume of the respective preheating, reaction and quenching zones, the optimum preheat temperature and short reaction time may be maintained and a maximum yield of acetylene realized without substantial consumption of heat supplied from exterior sources.

The reactor in which this process is carried out may take a variety of forms as will be apparent from the description of the accompanying drawings, below. In general, however, the reactor will comprise an elongated reaction vessel which is divided longitudinally into a plurality of parallel chambers extending the length of the vessel. The dividing walls are constructed of a heat conducting material so as to allow the transfer of heat between adjacent chambers. At one end of the vessel there are provided means for introducing reactant gas into alternate chambers, and means for withdrawing product gas from the remaining alternate chambers. At the opposite end of the vessel there are provided means for withdrawing product gas from those chambers which at their opposite ends are fitted with reactant gas introducing means, and means for introducing reactant gas into those chambers which at their opposite ends are fitted with product gas withdrawal means. Each of the chambers comprises a preheating zone, a reaction zone and a quenching zone so located that the gas introduced into each chamber passes through these zones in the order named, and is withdrawn from the quenching zone through the product gas withdrawal means associated with that particular chamber. By reason of the alternate disposition of the chambers, the preheating zone associated with each chamber lies immediately adjacent to the quenching zone of the adjacent chamber, whereas the reaction zone of each chamber lies immediately adjacent to the reaction zone of the adjacent chamber. Also associated with each chamber are means for introducing a hydrogen-containing gas into each of the reaction zones. Such means may comprise tubular inlets disposed coaxially with the reactant gas preheating zone so that the hydrogen-containing gas is likewise preheated prior to its admixture with the preheated reactant gas in the reaction zone, and enters the reaction zone concurrently with the preheated reactant gas. They should be so constructed, however, that admixing of the hydrogen-containing gas with the reactant gas does not occur until the latter has become heated to the requisite preheat temperature. Alternatively, the hydrogen-containing gas inlet means may be disposed parallel to the preheating zone, or they may be so disposed that the hydrogen-containing gas enters the reaction zone from a direction other than parallel to that of the preheated reactant gas.

The process of the invention will be more clearly understood by reference to the accompanying drawing which forms a part of this specification. In said drawing.

Figure 1:
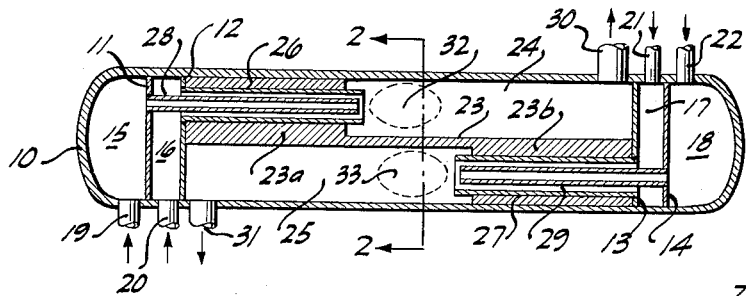
Figure 1 represents a longitudinal cross-sectional view of a simple apparatus embodying the principle of the invention.
Figure 2:
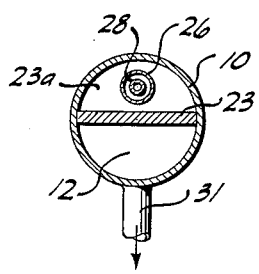
Figure 2 is a transverse cross-sectional view of the same apparatus taken along line 2—2 of Figure 1.

Referring now to Figures 1 and 2, in which like numerals designate like parts, the illustrated apparatus comprises a closed cylindrical vessel 10 provided with internal transverse walls 11, 12, 13 and 14 which define within vessel 10 a first reactant gas header 15, a first hydrogen-containing gas header 16, a second hydrogen-containing gas header 17, and a second reactant gas header 18. Header 15 is provided with a first reactant gas inlet 19, header 16 is provided with a first hydrogen-containing gas inlet 20, header 17 is provided with a second hydrogen-containing gas inlet 21, and header 18 is provided with a second reactant gas inlet 22. Each of said inlets communicates through suitable flow control devices to an exterior source of the appropriate gas, not shown. Within vessel 10, a heat-conducting longitudinal wall 23 divides the space between transverse walls 12 and 13 into hemi-cylindrical chambers 24 and 25 of equal volume. Each of said chambers constitutes a reaction and quenching zone for the gases introduced into headers 15 and 16, and headers 17 and 18, respectively. The dividing wall 23 is provided with hemi-cylindrical end portions 23a and 23b disposed on opposite sides of its major axis, which end portions limit the length of chambers 24 and 25 to somewhat less than distance between transverse walls 12 and 13 but not to such an extent that they fail to overlap. End portions 23a and 23b are bored to receive first and second hydrogen-containing gas preheating tubes 26 and 27 which communicate between chamber 24 and header 16, and between chamber 25 and header 17, respectively. Positioned coaxially within first and second hydrogen-containing gas preheating tubes 26 and 27, are first and second reactant gas preheating tubes 28 and 29, respectively, which communicate between chamber 24 and header 15, and between chamber 25 and header 18, respectively. First and second product gas outlet conduits 30 and 31 communicate between chambers 24 and 25 and product gas storage means, not shown, and are positioned adjacent to the end of each chamber opposite that defined by end-portions 23a and 23b.

Operation of the reactor shown in Figures 1 and 2 is as follows: A first stream of reactant gas comprising a hydrocarbon and oxygen, e. g. a suitably proportioned mixture of methane or natural gas and air, is introduced into header 15 through inlet 19, and passes through reactant gas preheating tube 28 into chamber 24. Simultaneously, a hydrogen-containing gas, e. g. hydrogen itself or a mixture of hydrogen and nitrogen or other inert gas, is introduced into header 16 through inlet 20, and passes into chamber 24 through the annular space between tubes 26 and 28. During the passage of these gases through their respective preheating tubes they are preheated to a moderately high temperature, e. g. 600° C. or above, by the transfer of heat through the end-portion 23a of wall 23 from hot product gases which occupy adjacent chamber 25. At the termination of tubes 26 and 28, the reactant gas and hydrogen-containing gas become admixed, whereby the acetylene-producing reaction is initiated. Such reaction takes place within reaction zone 32, which may take the form of a free flame, within chamber 24, and occurs with the evolution of sufficient heat to raise the temperature of the reacting gases to 1100°–1500° C. The hot product gas passes from reaction zone 32 through the remainder of the length of chamber 24 which constitutes a quenching zone. Within this zone the hot product gas loses a large proportion of its sensible heat by heat transfer through end-portion 23b of dividing wall 23 to cold hydrogen-containing and reactant gas streams passing through preheating tubes 27 and 29, respectively. The rate of flow of the hot product gas through the quenching zone is so controlled as to become cooled to a temperature at which substantially no further reaction occurs within from about 0.001 to about 0.05 second after admixing of the preheated hydrogen-containing and reactant gases at the termination of preheating tubes 26 and 28. The cooled product gas is withdrawn from the quenching zone and is passed to product gas storage and recovery system through outlet conduit 30. Concurrently in time with these operations, second reactant gas and hydrogen-containing gas streams are introduced into their respective headers through inlets 22 and 21, respectively, and pass through their respective preheating tubes 29 and 27 wherein they are preheated by the transfer of heat from the first hot product gas stream in chamber 24 through end-portion 23b of dividing wall 23. The preheated gases become admixed at the termini of tubes 27 and 29, and react with the evolution of heat to form acetylene in reaction zone 33 within chamber 25. The hot product gas then passes through the remaining length of chamber 25 which constitutes a quenching zone, and is cooled to a temperature at which substantially no further reaction occurs by loss of heat through end-portion 23a of dividing wall 23 to the first streams of reactant and hydrogen-containing gases passing through their respective preheating tubes 28 and 26. As in the case of the first product gas stream, the second product gas should be cooled to such temperature within 0.001–0.05 second after admixing of the reactant and hydrogen-containing gas at the termini of tubes 27 and 29. The cooled product gas is withdrawn from chamber 25 and passed to product gas storage and recovery means through outlet conduit 31.

It will be seen that this process and apparatus permits a most efficient utilization of the exothermic heat of reaction. Such heat is sufficient to preheat the reactant gas to the necessary temperature and, in a well-insulated reactor, to make up for incidental heat losses to the atmosphere. It is a feature of the invention that the reaction zones of the respective gas streams lie substantially side-by-side and are separated only by a relatively thin heat-conducting wall. The two reactions are thus effected in indirect heat exchange relationship with one another although under normal conditions there is substantially no transfer of heat from one reaction zone to the other. By operating in this manner, heat losses from the reaction zone are reduced and the requisite high reaction temperature can be maintained autothermically. Loss of heat through the exterior walls of the reactor may be avoided through the use of suitable insulation. As will be apparent to those skilled in the art, maximum thermal efficiency will be attained by suitably sub-dividing each of the reactant gas streams into a number of smaller streams and conducting the operation so that each of said smaller streams is in heat exchange relationship with an adjacent stream. The apparatus and process described in connection with Figures 1 and 2 have been limited to two streams merely to simplify illustration of the principle of the invention.

Figure 4:
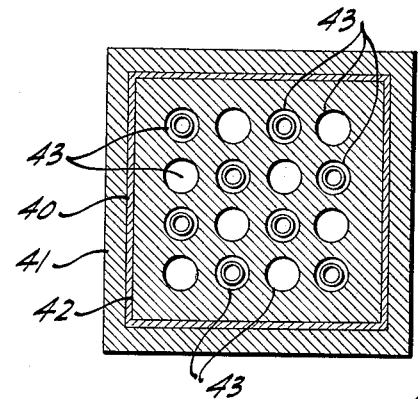
Figure 4 is a transverse cross-sectional view of the same reactor taken along line 4—4 of Figure 3.
Figure 3:
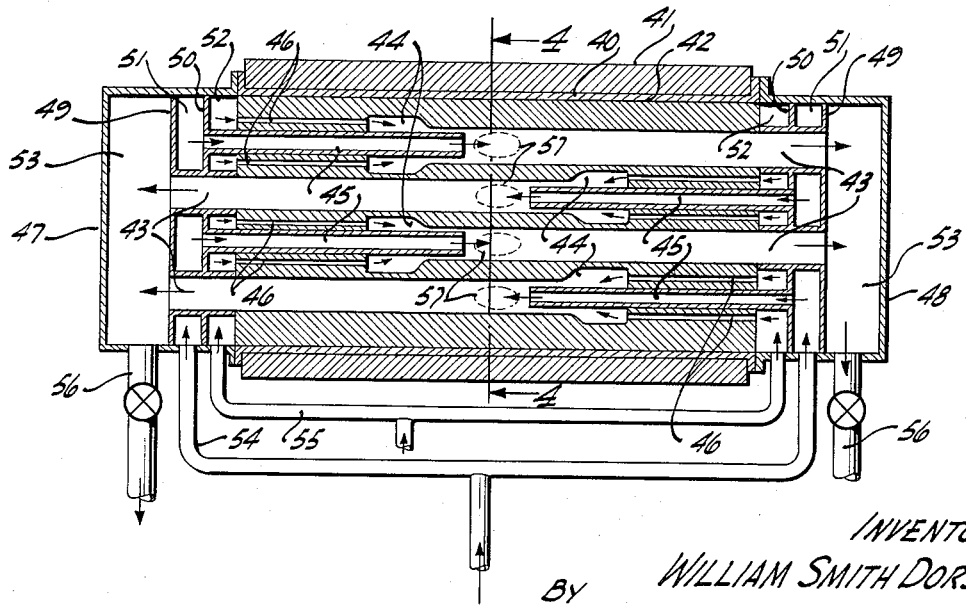
Figure 3 is a longitudinal cross-sectional view of a multi-chambered autothermic reactor suitable for carrying out the process of the invention on a commercial scale.

Referring now to Figures 3 and 4, in which like numerals designate like parts, there is shown a large-scale reactor which comprises a metal shell 40 of substantially square cross-section and provided with an outside layer of thermal insulation 41. Shell 40 surrounds core 42 which is composed of a refractory mass such as sillimanite, mullite, or other known type of dehydrated aluminum silicate ceramic material. Core 42 is provided with a plurality of uniformly arranged substantially parallel longitudinal holes bored alternately from opposite ends of the core, each of said holes forming an elongated chamber 43. There are thus provided two sets of chambers extending from opposite ends of core 42 having axes which are substantially parallel but spaced apart so that each member of the first set of chambers lies adjacent to a member of the second set of chambers and is separated therefrom by a relatively thin internal wall of the core. Each of said chambers terminates within core 42 in an enlarged chamber 44 at a point somewhat beyond the transverse central plane (4—4) of the core, and each of said enlarged chambers communicates with the near end of the core by means of a longitudinal bore adapted to receive reactant gas preheating tube 45. Each of the latter tubes extends through enlarged chamber 44 and into chamber 43, terminating at a point short of the transverse central plane (4—4) of core 42. Each of enlarged chambers 44 also communicates with the near end of the core by means of two or more longitudinal bores 46 which serve as hydrogen-containing gas preheating zones. The ends of core 42 are closed by headers 47 and 48 attached to shell 40. Each of said headers is provided with transverse interior walls 49 and 50 which define reactant gas introduction zones 51, hydrogen-containing gas introduction zones 52, and product gas withdrawal zones 53. Each of the reactant gas introduction zones 51 communicates with reactant gas preheating tubes 45 and with reactant gas manifold 54 which leads from an exterior supply of reactant gas, not shown. Each of the hydrogen-containing gas introduction zones 52 communicates with hydrogen-containing gas preheating zones 46 and with hydrogen-containing gas manifold 55 which leads from an exterior supply of hydrogen-containing gas, not shown. Each of said product gas withdrawal zones 53 communicates with chamber 43 and with product gas withdrawal conduit 56 which leads to product gas storage and recovery means, not shown.

Operation of this reactor is substantially the same as that of the reactor shown in Figures 1 and 2. The reactant gas is introduced into the reactor through manifold 54, and passes by way of introduction zones 51 to preheating zones 45. During its passage through zones 45 the reactant gas is preheated by indirect heat exchange against hot product gases which occupy the adjacent chambers 43. The hydrogen-containing gas is introduced into the reactor through manifold 55, and passes by way of introduction zones 52 through preheating zones 46 and into the enlarged chambers 44. The latter serve to promote uniform introduction of the hydrogen-containing gas into the reaction zones 57. Reaction occurs upon such admixing as previously described, and the hot product gases pass through the remaining length of chambers 43 which constitute quenching zones wherein heat is transferred to the adjacent preheating zones 45 and 46. The quenched product gases are withdrawn from the reactor through withdrawal zones 53 and conduits 56, and are passed to product gas storage means, not shown.

It will readily be seen that the reactor of Figures 3 and 4 operates on the same principle as that of Figures 1 and 2, but differs therefrom in that each of the two streams of reactant gases which pass countercurrently and in heat exchange relationship through the reactor is sub-divided into a plurality of concurrent streams. By operating in this manner, both the capacity and the thermal efficiency of the reactor are greatly increased. As will be readily apparent to those skilled in the art, multi-chambered reactors of the general type shown in Figures 3 and 4 may take a variety of forms. Thus, the chambers which constitute the reaction and quenching zones and the preheating zones associated therewith may be arranged in a circular pattern, with the reaction vessel taking the form of a closed cylinder. Similarly, the hydrogen-containing gas may be introduced into the reaction zone coaxially with the reactant gas or from a direction perpendicular thereto; and the enlarged chambers 44 may be of varying sizes and shapes adapted to promote intimate non-turbulent mixing of the hydrogen-containing gas and the reactant gas in reaction zone 57, or may be omitted entirely. Also, if desired the reactant gas preheating tubes may be eliminated, whereby the bore which is described as receiving these tubes will itself serve as the preheating zone.

Considering now the operating variables in somewhat greater detail, the reactant gas consists essentially of a proportioned mixture of a hydrocarbon and oxygen. A wide variety of hydrocarbons are suitable, but best results are obtained with non-aromatic hydrocarbons, particularly those which are normally gaseous or are liquids which boil below about 400° F. under atmospheric pressure. The term "non-aromatic hydrocarbons" is herein employed as a generic term to include saturated and unsaturated aliphatic and cycloaliphatic hydrocarbons but excluding aromatic or benzenoid hydrocarbons. The normally gaseous saturated hydrocarbons, particularly methane and natural gas, are especially preferred by reason of their low cost and ease of handling. Hydrocarbon mixtures, e. g., mixed refinery gases and various petroleum distillates, are also suitable. When employing a liquid hydrocarbon reactant exterior means are usually provided for vaporizing the same prior to its admixture with the oxygen and/or prior to its introduction into the reactant gas preheating zone, but such vaporization may be effected within the preheating zone itself. The oxygen reactant is pure oxygen itself, oxygen-enriched air, ordinary air, or any other gas containing free oxygen. Air is preferred by reason of its lack of cost, and it is one of the features of the present process that the results obtained employing air are comparable or better than those of previous processes in which pure oxygen has been employed. The mole ratio of hydrocarbon to oxygen in the reactant gas varies between rather wide limits, depending upon the identity of the hydrocarbon. When the hydrocarbon is one of relatively high molecular weight, e. g., a petroleum distillate such as kerosene, as many as 50 moles of oxygen should be provided per mole of hydrocarbon. On the other hand, when the hydrocarbon is one of low molecular weight, e. g., methane or natural gas, an excess of the hydrocarbon is employed so that the mole ratio of hydrocarbon to oxygen is suitably between about 1.33/1 and about 2.0/1. Thus, the mole ratio of hydrocarbon to oxygen will vary from about 0.02/1 to about 2.0/1 depending upon the nature of the hydrocarbon. When the oxygen reactant is provided in the form of air and the hydrocarbon is methane or natural gas, the reactant gas mixture will comprise from about 17 to about 30 per cent by volume of the hydrocarbon and, correspondingly, from about 83 to about 70 per cent by volume of air. When the hydrocarbon comprises air and a petroleum distillate such as kerosene, it will comprise from about 4 to about 10 per cent by volume of hydrocarbon vapor and from about 96 to about 90 per cent by volume of air.

The hydrogen-containing gas which is admixed with the preheated reactant gas in the reaction zone to initiate the acetylene-producing reaction may be pure hydrogen or a suitable mixture of hydrogen and certain other gases.

Any inert gas, i. e., any gas which does not react with the other components of the system under the conditions prevailing in the reaction zone, may be employed in conjunction with the hydrogen. However, the use of nitrogen or carbon dioxide, as well as mixtures of the same, in combination with the hydrogen is particularly advantageous from an engineering standpoint. For the most part, the product gas comprises hydrogen, nitrogen and carbon monoxide in addition to unreacted hydrocarbon and the acetylene product. While it is possible to separate all of these components in substantially pure form and thus recover pure hydrogen for re-use in the process, it is more economical to separate the hydrogen in admixture with part of the nitrogen and/or carbon monoxide and to employ such mixture as the gas which is admixed with the preheated reactant gas in the reaction zone. Accordingly, employing the hydrogen in the form of a mixture with nitrogen or carbon monoxide or both is superior to employing the hydrogen in pure form from the standpoint of simplicity and economy in recovering the hydrogen from the product gas for re-use in the process. Such mixture may comprise as little as about 30 per cent up to 100 per cent by volume of hydrogen and, correspondingly, as much as about 70 per cent down to zero per cent by volume of the inert gas. However, since the inert gas has a cooling effect within the reaction zone, the use of mixtures containing relatively large proportions of the inert gas requires the use of such high preheat temperatures in order to secure the necessary high reaction temperature that it may not be possible to sustain the reaction autothermally. In such case, it is necessary to add heat to the process, e. g., by providing an exterior source of heat to supplement the preheating step. On the other hand, the cost of separating hydrogen mixtures from the product gas increases with the concentration of the hydrogen in the mixture. Accordingly, the optimum composition of the hydrogen-containing gas will be determined by balancing the cost of separating such gas from the product gas against the cost of supplying additional heat. Usually, the optimum gas mixture will contain from about 85 to about 95 per cent by volume of hydrogen and from about 5 to about 15 per cent by volume of an inert gas selected from the class consisting of nitrogen, carbon monoxide, and mixtures of the same. Regardless of the composition of the hydrogen-containing gas, it should be employed in an amount sufficient to provide from about 0.5 to about 5 moles, preferably from about 1.5 to about 3 moles, of hydrogen per mole of hydrocarbon in the reactant gas.

The temperature to which the reactant gas is preheated prior to its introduction into the reaction zone and therein admixed with the hydrogen-containing gas is such that the temperature attained in the reaction which is induced by said admixing is between about 1100° C. and about 1500° C., preferably between about 1275° C. and about 1375° C. The preheat temperature necessary to attain a reaction temperature within this range depends upon a number of factors, including the composition of the reactant gas, the residence time within the preheating zone, and the amount of turbulent mixing of the reactant gas components which may take place during the preheating. All of these factors are variables which contribute to the possibility of reaction occurring between the reactant gas components during the preheating and in the absence of the added hydrogen. Inasmuch as it is desirable to avoid such reaction, these variables should be so controlled that the preheat temperature is sufficient to attain the desired subsequent reaction temperature but is not so high that reaction between the components of the reactant gas takes place to any substantial extent during preheating. Accordingly, with reactant gas mixtures of the composition previously given it is usually desirable to preheat as rapidly as possible, e. g., in from about 0.005 to about 0.5 second, and to avoid obstructed flow which would cause turbulent mixing during the preheating. Thus, it is usually preferred to combine the components of the reactant gas prior to preheating the same, and to pass the mixture through the preheating zone at a relatively high velocity. Under ordinary conditions of operation the preheat temperature will be between about 600° C. and about 1150° C. with a preheat time between about 0.1 and about 0.005 second. When air is employed as the source of oxygen the preheat temperature will usually be in the upper end of this range, e. g., from about 950° C. to about 1150° C. When pure oxygen is employed the preheat temperature will be somewhat lower, e. g., 600°–1000° C.

The reaction time, i. e., the time interval between admixture of the reactant gas and the hydrogen-containing gas and the cooling of the product gas to a relatively low temperature, and the reaction temperature are more or less interdependent, shorter reaction times being employed at high temperatures and vice versa. Such time is between about 0.001 and about 0.05 second, preferably between about 0.002 and about 0.02 second, and is readily controlled by varying the rate at which the reactant gas and hydrogen-containing gas are introduced into and withdrawn from the reaction zone. As herein explained, the cooling of the hot product gas to a temperature at which substantially no further reaction occurs within the stated period of time is, in the present process, accomplished by heat exchange against a second stream of reactant gas. If desired, additional quenching means may be provided to cool the product gas to still lower temperatures suitable for subsequent treatment of the gas for separation of the various components thereof.

Since the process of the invention utilizes the exothermic heat of reaction for preheating the reactant gas, it is necessary that heat be supplied from an exterior source during start-up. This may be accomplished in a variety of ways, one of the simplest of which comprises initially operating the process without the addition of the hydrogen-containing gas and with a reactant gas which is enriched in oxygen so that it is combustible in the conventional manner. Such gas is merely passed into the reaction zone where it is ignited by suitable means and allowed to burn. When the required preheat temperature is attained the proportion of oxygen is reduced so that the gas is of the composition herein specified and the hydrogen-containing gas is introduced into the reaction zone, whereupon the acetylene-producing reaction is initiated and maintained as herein explained.

As will be apparent to those skilled in the art, various engineering techniques may be applied to the practice of the process of the invention, and the apparatus may take a variety of forms. Separation of the acetylene product from the mixed product gas may be effected in various ways, e. g., by selective solvent extraction, selective adsorption, etc., and since the process operates without the consumption of hydrogen, the product gas may be treated in similar ways to recover hydrogen for re-use in the process.

Other modes of applying the principle of my invention may be employed instead of those explained, change being made as regards the materials or apparatus employed provided the steps stated by any of the following claims, or the equivalent of such stated steps, be employed.

I, therefore, particularly point out and distinctly claim as my invention:

1. In a process for the production of acetylene wherein (1) a reactant gas mixture essentially comprising a hydrocarbon and oxygen is continuously passed through a preheating zone wherein it is preheated to a temperature such that upon its subsequent admixture with a hydrogen-containing gas comprising from about 30 to 100 per cent by volume of free hydrogen and from about 70 to zero per cent by volume of an inert gas a temperature between about 1100° C. and about 1500° C. is attained in the exothermic acetylene-producing reaction which is induced by said admixing; (2) the preheated reactant gas is passed through a reaction zone wherein it is continuously admixed with a hydrogen-containing gas of said composition and wherein said acetylene-producing reaction occurs with the formation of a hot acetylene-containing product gas; and (3) said hot product gas is continuously passed through a quenching zone wherein it is cooled to a temperature at which substantially no further reaction occurs within from about 0.001 to about 0.5 second after said admixing of the hydrogen-containing gas with the preheated reactant gas; the improvement which consists in dividing the reactant gas mixture into first and second reactant gas streams of substantially equal volume; preheating the first reactant gas stream by indirect heat exchange against hot acetylene-containing product gas which results from reaction of the second reactant gas stream, whereby said hot product gas is cooled; preheating the second reactant gas stream by indirect heat exchange against hot acetylene-containing product gas which results from reaction of the first reactant gas stream, whereby the latter hot product gas is cooled; and effecting the reaction of the preheated first reactant gas simultaneously and in indirect heat exchange relationship with the reaction of the preheated second reactant gas.

2. A process according to claim 1 wherein the reactant gas comprises oxygen and a hydrocarbon selected from the class consisting of methane and natural gas, the mole ratio of hydrocarbon to oxygen being between about 1.33/1 and about 2.0/1.

3. A process according to claim 1 wherein the reactant gas comprises from about 17 to about 30 percent by volume of a hydrocarbon selected from the class consisting of methane and natural gas and from about 83 to about 70 percent by volume of air.

4. A process according to claim 1 wherein the first and second reactant gas streams are each preheated to a temperature between about 600° C. and about 1150° C.

5. A process according to claim 1 wherein the hydrogen-containing gas is employed in an amount sufficient to provide from about 0.5 to about 5 moles of hydrogen per mole of hydrocarbon in each reactant gas stream.

6. A process according to claim 1 wherein the hydrogen-containing gas comprises from about 85 to about 95 percent by volume of hydrogen and from about 15 to about 5 percent by volume of an inert gas selected from the class consisting of nitrogen, carbon monoxide, and mixtures of nitrogen and carbon monoxide.

7. In a process for the production of acetylene wherein (1) a reactant gas mixture essentially comprising between about 17 and about 30 percent by volume of a hydrocarbon selected from the class consisting of natural gas and methane and between about 83 and about 70 percent by volume of air is continuously passed through a preheating zone wherein it is heated to a temperature between about 600° C. and about 1150° C.; (2) the preheated reactant gas is continuously passed through a reaction zone wherein it is admixed with a hydrogen-containing gas comprising between about 30 and 100 percent by volume of hydrogen and between about 70 and zero percent by volume of an inert gas selected from the class consisting of nitrogen, carbon monoxide, and mixtures of nitrogen and carbon monoxide, said hydrogen-containing gas being employed in an amount sufficient to provide between about 1.5 and about 3 moles of hydrogen per mole of hydrocarbon and said admixing inducing an exothermic acetylene-producing reaction and a rise in temperature to a value between about 1100° C. and about 1500° C.; and (3) the hot acetylene-containing product gas which is thereby formed is continuously passed through a quenching zone wherein it is cooled to a low temperature at which substantially no further reaction occurs within from about 0.001 to about 0.05 second after said admixing of the hydrogen-containing gas and the preheated reactant gas; the improvement which consists in dividing the reactant gas mixture into first and second reactant gas streams of substantially equal volume; preheating the first reactant gas stream to the aforesaid preheat temperature by indirect heat exchange against hot acetylene-containing product gas which results from reaction of the second reactant gas stream, whereby said product gas is cooled to the aforesaid low temperature within the aforesaid period of time; preheating the second reactant gas stream to the aforesaid preheat temperature by indirect heat exchange against hot acetylene-containing product gas resulting from reaction of the first reactant gas stream, whereby the latter hot product gas is cooled to the aforesaid low temperature in the aforesaid period of time; and effecting the reaction of the preheated first reactant gas simultaneously in indirect heat exchange relationship with the reaction of the preheated second reactant gas.

8. A process according to claim 7 wherein the hydrogen-containing gas is preheated to substantially the same temperature as the reactant gas prior to its admixture therewith.

References Cited in the file of this patent
UNITED STATES PATENTS

| Number | Name | Date |
|---|---|---|
| 1,324,443 | Conover | Dec. 9, 1919 |
| 1,965,770 | Burgin | July 10, 1934 |
| 1,989,927 | Houdry | Feb. 5, 1935 |
| 2,167,471 | Auerbach | July 25, 1939 |
| 2,191,510 | Whitehurst | Feb. 27, 1940 |
| 2,377,245 | Krejci | May 29, 1945 |
| 2,498,444 | Orr | Feb. 21, 1950 |
| 2,529,598 | Deanesly | Nov. 14, 1950 |
| 2,645,673 | Hasche | July 14, 1953 |